(12) United States Patent
Fluhler et al.

(10) Patent No.: US 7,600,423 B1
(45) Date of Patent: Oct. 13, 2009

(54) VOLUME OR FLUID LEVEL SENSING SYSTEM AND METHOD

(76) Inventors: Herbert U. Fluhler, P.O. Box 22463, Huntsville, AL (US) 35814; Hans Schantz, 515 Sparkman Dr., Huntsville, AL (US) 35816

( * ) Notice: Subject to any disclaimer, the term of this patent is extended or adjusted under 35 U.S.C. 154(b) by 151 days.

(21) Appl. No.: 11/977,307

(22) Filed: Oct. 24, 2007

Related U.S. Application Data

(60) Provisional application No. 60/853,883, filed on Oct. 24, 2006.

(51) Int. Cl.
*G01F 23/26* (2006.01)
(52) U.S. Cl. ............... 73/290 B; 73/290 R; 73/291; 73/304 R
(58) Field of Classification Search .......... 73/290 B, 73/290 R, 290 V, 291–334
See application file for complete search history.

(56) References Cited

U.S. PATENT DOCUMENTS

| | | | | |
|---|---|---|---|---|
| 3,089,337 A | * | 5/1963 | Cutsogeorge | 73/295 |
| 3,511,580 A | * | 5/1970 | Eckhardt et al. | 417/48 |
| 3,987,236 A | * | 10/1976 | Kohler et al. | 373/145 |
| 4,095,726 A | * | 6/1978 | Hechler et al. | 222/175 |
| 4,165,641 A | * | 8/1979 | Pomerantz et al. | 73/290 R |
| 4,446,562 A | * | 5/1984 | Friedmann et al. | 373/149 |
| 4,526,298 A | * | 7/1985 | Boxer et al. | 222/130 |
| 5,078,010 A | * | 1/1992 | Lock | 73/304 R |
| 6,212,959 B1 | | 4/2001 | Perkins | |
| 6,840,100 B1 | | 1/2005 | Wotiz | |
| 6,990,860 B1 | * | 1/2006 | Gillanders | 73/149 |
| 2005/0046419 A1 | * | 3/2005 | Nicolazo de Barmon et al. | 324/229 |

FOREIGN PATENT DOCUMENTS

| | | | |
|---|---|---|---|
| JP | 55144508 A | * | 11/1980 |
| JP | 01197614 A | * | 8/1989 |

* cited by examiner

*Primary Examiner*—David A. Rogers
(74) *Attorney, Agent, or Firm*—Mark Clodfelter

(57) ABSTRACT

A volume or fluid level sensing system as taught by the present invention comprises a flexible bladder, a solenoidal coil, a means for volume or fluid level measurement, and a user interface. Means for volume or fluid level measurement are preferentially means for inductance measurement which may be selected from the set including timing inductive measurement means, AC voltage divider inductive measurement means, resonance inductive measurement means. A user interface may be selected from the set including a digital display, a data interface, a voltage level display device, or a current level display device. The solenoidal coil may be embedded in the flexible bladder or in a flexible sock encompassing the flexible bladder. In addition, a bladder volume or fluid level indicating method as taught by the present invention comprises the steps of inductance measurement, volume or fluid level inference, and volume or fluid level reporting.

20 Claims, 6 Drawing Sheets

VOLUME OR FLUID LEVEL SENSING SYSTEM AND METHOD

CROSS REFERENCE TO RELATED APPLICATION

This application claims the benefit of provisional application No. 60/853,883, filed Oct. 24, 2006, which is incorporated in its entirety by reference.

STATEMENT REGARDING FEDERALLY FUNDED DEVELOPMENT

This invention was made with Federal government support. Thus, the Government retains certain rights in the invention. The Federal government shall have a nonexclusive, non-transferable, irrevocable, paid-up license to practice or have practiced for or on behalf of the United States the subject invention throughout the world.

FIELD OF THE INVENTION

This application relates to deformable devices for holding fluids or gasses, such as water or air, or a combination of both, and particularly to such a device including a system for determining and indicating quantity of a volume of void, air, or fluid, or possibly both, in a flexible bladder. This application also relates to deformable solids, such as materials with high thermal expansion coefficients and also foams, and particularly to such a device including a system for determining and indicating the volume of the deformable solid where a volume change has been effected by environmental changes such as thermal expansion or by mechanical manipulation such as manual impression on the solid.

BACKGROUND OF THE INVENTION

When in the field, soldiers typically carry canteens filled with water. In the past, the canteen was a rigid container typically carried on a duty belt or a backpack harness. However, in recent years the canteen has evolved into a highly deformable bladder having a tube terminating with a bite valve the soldier bites to open, allowing him/her to draw water from the bladder. As water is drawn from the bladder, it collapses and occupies less space.

One problem with respect to such a bladder hydration system is that with all the gear a soldier must wear and carry on combat missions, particularly extended missions, the canteen may become hidden or covered, making it impossible to ascertain quantity of water in the bladder. In other situations, the soldier may be lying or sitting, or in some other position where the bladder is squeezed into an irregular shape, or may be squeezed into an irregular shape by gear the soldier is carrying. These situations make a conventional liquid measuring system, as found in a rigid container, completely unworkable as the bladder is not rigid, and there is no assurance that the bladder will always be in an "up" orientation when the soldier wishes to check his supply of water.

One possible solution is the "buddy system" in which everyone checks everyone else's canteen levels. However, there are times when buddies are not around, are busy, just forget, or don't get it right. Furthermore, there are a number of bladder-type canteens that do not provide any easy or immediate access to physical measurement, such as those embedded or integrated into a back pack.

One approach to measuring the canteen fluid level is proposed in U.S. Pat. No. 6,840,100, and also some of the cited references therein, which use capacitance to infer a quantity of water in a hydration bladder. However, such a system suffers inaccuracies because of variable dielectric loading of the bladder sensors due to close proximity of the soldier's body, which has a dielectric constant of around 80 or so as opposed to air, which has a dielectric constant of around 1. In addition, close proximity of equipment, much of which is fabricated of metal, to the capacitive sensors would also radically change capacitance in the area around such a bladder. In addition, the capacitance of the bladder will change when the bladder is squeezed into irregular shapes. The approach disclosed in U.S. Pat. No. 6,840,100 attempts to compensate for these problems through various means, but it is at least a very complicated scheme, and likely still highly susceptible to bias from the local effects of soldier's gear and local environment, both of which make it more expensive and less reliable than desired. From the foregoing, a capacitive system for a hydration bladder appears generally unworkable to accurately and reliably measure a quantity of fluid therein.

Another approach is using bend sensors that measure bending of the bladder. Such a system would require a number of bend sensors positioned throughout the bladder, and complex signal processing to integrate readings from each. Here, distension of the bladder may correlate with quantity of water in the bladder, with more water producing more curvature. If the soldier is standing, then bend sensors would measure low bending at the top of the bladder, and higher bending at lower regions of the bladder. However, if the bladder is squeezed into an irregular shape by surrounding gear, or some portion of gear is lying on or protruding into the bladder, then fullness readings will be inaccurate. Similar arguments hold for trying to use stress or tension sensors. In addition, such a system would be expensive to produce and complicated to the point of being unreliable under combat and field conditions.

Acoustic sensors are a possibility, but there is no data suggesting such a system will work. For instance, if one monitors sloshing sounds, such sounds would disappear if the soldier is still or resting. Where a sonar-type system is used, it would be simple for enemy forces to develop listening devices that could pinpoint position of troops from sound of such a system. Further, such a system would require significant signal processing, making the system expensive and prone to failure.

Conventional fluid flow sensors might be adapted for this application, as taught by Perkins in U.S. Pat. No. 6,212,959. However accurate flow sensors tend to be complicated and cost-prohibitive. Also they only measure the flow leaving the bag. Without a second flow sensor to monitor how much fluid is entering the bag, it is easy for a flow sensor to drift away from accurate fluid level measurement. A fluid flow sensor inherently fails to provide an accurate or reliable fluid-volume or fluid level measurement.

In one embodiment, a fluid level sensor optimized for military hydration systems must meet demanding specifications. It must tolerate wide variations in orientation, temperature, fluid composition, and pressure. It must be easy to operate, simple, reliable, low-cost, low-power, light-weight, low-maintenance, and accurate. Ideally, it must draw minimal amounts of power, or scavenge necessary energy from the environment so as not to require batteries. A fluid level sensor optimized for military hydration systems must reliably answer the question "how much water is left in your canteen?" in harsh military training and operational environments while meeting all these demanding specifications.

In view of the foregoing, there is a need for a volume and fluid level sensor and method optimized for military hydration systems. There is a further need for a volume and fluid level sensor and method that can yield reliable and accurate level measurements even in a flexible container at arbitrary orientations. Additionally, there is a need for a volume and fluid level sensor and method that allows easy determination of fluid level by an individual without the assistance of buddies or comrades. Finally, there is a need for a volume and fluid level sensor and method that can operate with minimal power, prolonging battery life, or dispensing with batteries all together and operating off of scavenged energy.

Accordingly, it is one object of the present invention to provide a volume and fluid level sensor and method optimized for military hydration systems. It is a further object of the present invention to provide a volume and fluid level sensor and method that can yield reliable and accurate level measurements even in a flexible container at arbitrary orientations. Yet another object of the present invention is to provide a volume and fluid level sensor and method that allows easy determination of fluid level by an individual without the assistance of buddies or comrades. A still further object of the invention is to provide a volume and fluid level sensor and method that can operate with minimal power, prolonging battery life, or dispensing with batteries all together and operating off of scavenged energy.

In addition to these objects, it is also an objective of this invention provide a volume and fluid level sensor to measure a defined, nominally enclosed volume, where the volume may contain either substance or void or a combination, with the purpose of sensing environmental changes that produce changes in the volume, or sensing mechanically induced changes to the volume such as from tactile impression.

In accordance with the foregoing, Applicants propose a system and apparatus for determining a volume or degree of inflation of a flexible bladder, which may be used to infer a quantity of fluid or gas or combination thereof in such a bladder. Applicants further propose a system and apparatus for determining the volume or degree of distention of a flexible solid, which may be used to infer a change in some environmental or other physics parameter, or the mechanical impress to the deformable solid by air pressure, a foreign body or tactile pressure. The system and apparatus is lightweight, simple in its fabrication and low in cost, and reliable in operation. In hydration systems, Applicants' system and apparatus is highly durable, consumes little electrical power, or possibly scavenges power from its surroundings, and is insensitive to changes in shape and close proximity of metal objects and other objects that would interfere with capacitive and magnetic systems. Similar benefits are enjoyed by other bladder volume or media quantity applications such as measuring intravenous bags. In physics and environmental parameter measurement applications, Applicant's system and apparatus enjoys similar advantages and offers new means for measuring such parameters. In mechanical and tactile impress applications Applicant's system and apparatus offer a new method for sensing mechanical and human contact and pressure that does not depend on more error prone and less reliable capacitive or mechanical switch methods With these and other objects, advantages, and features of the invention that may become hereinafter apparent, the nature of the invention may be more clearly understood by reference to the detailed description of the invention, the appended claims and to the several drawings herein.

DETAILED DESCRIPTION OF THE DRAWINGS

Overview of the Invention

Figure 1:
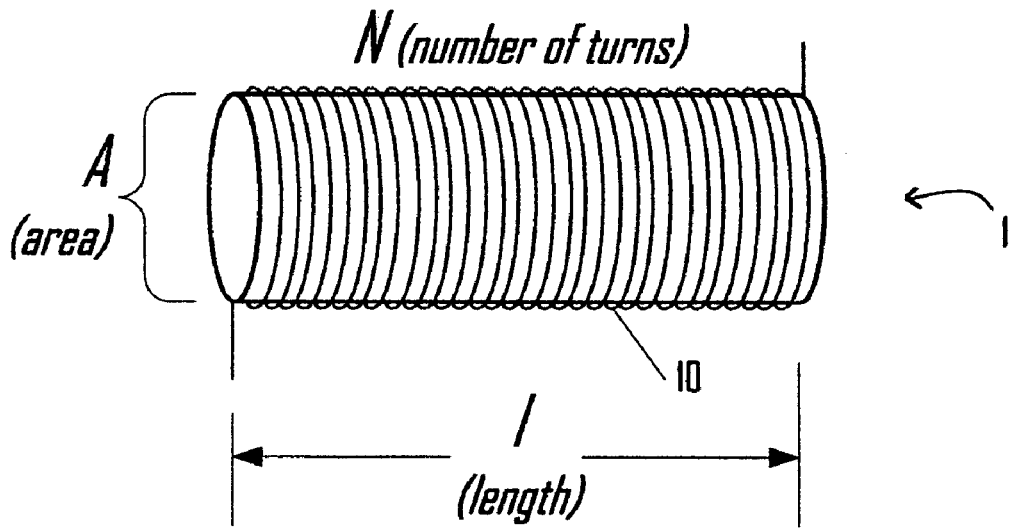
FIG. 1 is a drawing of a solenoid.

The objects and applications are met by the present invention: a volume and fluid level sensor and method. A volume and fluid level system as taught by the present invention comprises a flexible bladder, a solenoidal coil, a means for inductance measurement, and a user interface. Means for inductance measurement may be selected from the set including timing inductive measurement means, AC voltage divider inductive measurement means, resonance inductive measurement means. A user interface may be selected from the set including a digital display, a data interface, a voltage level display device, or a current level display device. The solenoidal coil may be embedded inside the flexible bladder, embedded as part of the flexible bladder or it may be in a flexible sock encompassing the flexible bladder. For measuring only volume, the solenoidal coil may be self supporting, mounted on some material substrate, or formed on the surface of a deformable solid such as a foam body.

On other embodiments, the present invention teaches a fluid level sensing hydration system comprising a flexible bladder, a solenoidal coil substantially encompassing the flexible bladder, a means for fluid measurement, and a user interface. In yet other embodiments, means for fluid measurement includes a means for inductance measurement. The fluid sensor may further encompass energy scavenging means that may include a turbine propeller or a compressible handle generator means.

In addition, the present invention discloses a volume or fluid level sensing method comprising the steps of inductance measurement, volume or fluid level inference, and volume or fluid level reporting. Inductance measurement may include timing inductive measurement means, AC voltage divider inductive measurement means, resonance inductive measurement means, or other inductive measurement means. Volume or fluid level inference may include utilization of a polynomial model of inductance versus volume or fluid level, a look-up table of volume or fluid level from inductance, a linear interpolation between typical measured results, or other inference means. A polynomial model of inductance versus volume or fluid level may include a linear fit, a cubic fit, or other order fit. The volume or fluid level sensing means may further include generating power from energy scavenging means. Volume or fluid level reporting utilizes an interface that may be selected from the set including a digital display, a data interface, a voltage level display device, or a current level display device. The volume or fluid level sensing method may further comprise a quantity query. The level or volume query may be a user initiated level or volume query, a third party initiated level or volume query, or a machine or computer initiated level or volume query.

Applications that would benefit from such a system include any bladder based fluid containment system, such as modem hydration systems, or intravenous solution bags, which generally are the equivalent of a flexible bladder. Here, the bladder is vented when filled up so as to only contain fluid (or negligible air or void) and as the bag begins to empty, it becomes more distended at lower regions thereof, with upper portions of the bag being drawn closer together. Yet other fluid applications include fuel bladders in aircraft fuel tanks, vehicle (race car) fuel tanks, ship tanks and the like.

Further applications include measuring a volume of a gas or void within a flexible bladder, such as are found in balloons, blimps or dirigibles, air-leveling devices found in vehicles, bladders in submarine vehicles, and others. In addition, such a system may also be used to measure a combined volume of a gas and fluid in a flexible bladder.

A final set of applications includes measuring the volume of an expandable bladder or solid where a volume change is induced not only by the containment of a void, gas or fluid, but also or alternatively by some external environmental phenomenon. Such phenomenon might be the thermal expansion of the bladder or solid due to temperature, or barometric pressure change, or swelling due to humidity. Alternatively, the volume of a the expandable bladder or solid may be changed by mechanical impress, such as the mechanical deformation from the pressure of a body or a finger. Thus, the applications of the invention include a new touch, pressure or contact sensor that relies on inductance rather than the traditional capacitance means for instantiation.

Description of the Invention

The present invention is directed generally to measuring a volume within a partially or fully inflated volume, such as embodied in a flexible bladder or foam solid body, that may be distorted in shape and is in close proximity to water or dampness, or metal (ferrous) objects such as military gear, or high dielectric materials such as water, within an interior of a metal tank, objects and equipment in a surgical suite, and a variety of other diverse environments. In one particular embodiment of a volume or fluid level measurement system of the present invention, a volume sensor is integrated with and optimized for use in conjunction with a flexible bladder in a military hydration system worn by soldiers so that a soldier may immediately determine a quantity of water in the bladder without having physical access to the bladder. From such a teaching, other applications should be apparent to those skilled in the appropriate arts. For instance, and as noted above, a closely related application may be an intravenous solution bag incorporated with a warning system to alert attendants that the bag has emptied to a predetermined quantity of fluid. In a submarine-type craft wherein depth is controlled by degree of inflation of a flexible bladder, preselected or incremental depth settings may be stored in a computer memory, the depth settings correlating with a predetermined volume of air or gas within the bladder as measured by Applicants system.

Another closely related application is to measure any physical parameter that has a dependent coupling to the volume of a flexible material that is enclosed by a solenoidal coil as described herein. One example of a flexible material used in such a measurement system would be to use the thermal expansion of a nominally flexible material, for example a closed cell foam, or even a closed air sack, to measure the temperature. Another might be to use a sponge-like material that expands as exposed to moisture to measure partial liquid or humidity fraction. Any physical parameter that manifests a volume change in some flexible material may be measured by this means.

Yet another closely related application is to measure the mechanical impress of some instrument that presses on the apparatus to change its volume and thus be measurable with the present invention. This introduces a new method for detecting and measuring mechanical contact and pressure without mechanical switches or capacitance means, and one that can respond from any intrusion into the measured volume, not just from one (surface) direction.

The present invention will now be described more fully in detail with reference to the accompanying drawings, in which embodiments of the invention are shown. As noted, this invention should not be construed as limited to specific embodiments set forth herein; rather, they are provided so that this application will be thorough and complete and will fully convey the scope of the invention to those skilled in the art. Throughout the drawings, like numbers refer to like elements.

Inductive Fluid Level and Volume Sensing

FIG. 1 is a drawing of a solenoid 1. The solenoid 1 has a solenoidal coil 10 characterized by area A, length l, and number of turns N. The ability of the solenoid 1 to store magnetic energy is proportional to its inductance (L). The inductance of the solenoid 1 is approximately:

$$L = \mu_0 n^2 l A \tag{1}$$

where $\mu_0$ is the magnetic permeability of free space ($\mu_0 = 4\pi \times 10^{-7}$ Hm) and n is the number of turns per unit length (n=N/l) of the solenoidal coil 10. Note that the volume (V) inside the solenoid 1 is given by:

$$V = lA \tag{2}$$

Thus the volume within the solenoid 1 can be determined by a measurement of the inductance:

$$V = lA = L/(\mu_0 n^2) \tag{3}$$

Figure 2:
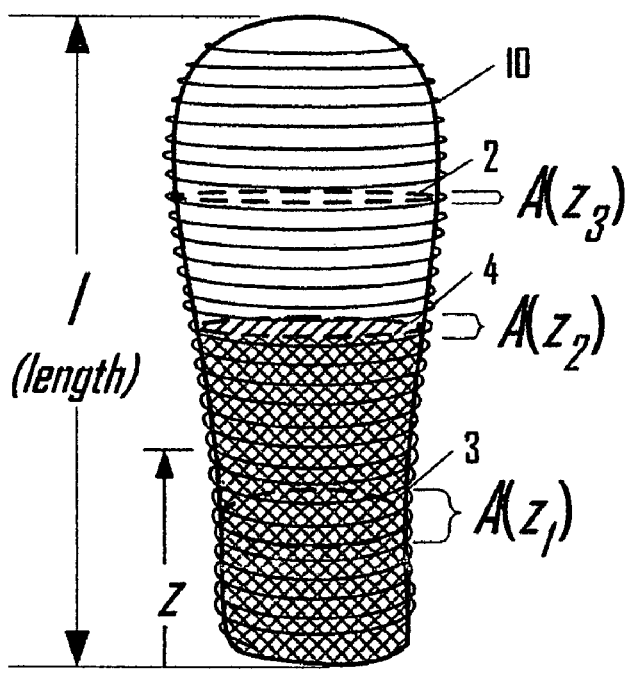
FIG. 2 is a drawing of a representative flexible bladder.

FIG. 2 is a drawing of a representative flexible bladder 2. The representative flexible bladder 2 is characterized by a length l along a particular axis coordinate z. The flexible bladder 2 is further characterized by a cross-sectional area A(z) that varies as a function of the axis coordinate, z. Typical hydration bladders may be from 12" to 16" or so in length, and of various diameters so as to hold 1-2 quarts of water.

The present invention teaches the transformation of the surface of the flexible bladder 2 into the surface of the solenoidal coil 10. The surface of the flexible bladder 2 should be substantially similar to the surface of the solenoidal coil 10. The solenoidal coil 10 is preferentially embedded within the surface of the flexible bladder 2 to ensure that the solenoidal coil 10 substantially encompasses the flexible bladder 2 and that the volume contained within the flexible bladder 2 is substantially similar to the volume contained within the solenoidal coil 10.

Figure 3:
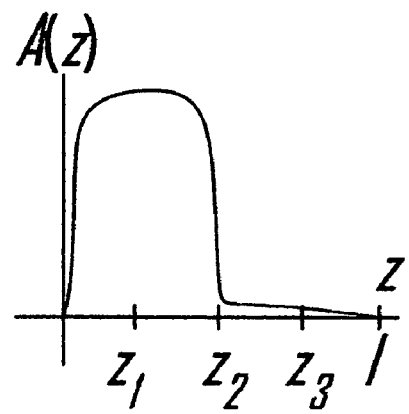
FIG. 3 is a plot of cross-sectional area A(z) as a function of axis coordinate z for a representative flexible bladder.

As shown above, the inductance per unit length of such a "bladder is the coil" configuration is proportional to the cross sectional area of the solenoidal coil 10. To the extent that one end of the solenoidal coil 10 might be "squished" or collapsed (for example because of the canteen being half full and upright), the solenoidal coil 10 at that position along its length will have smaller cross sectional area and hence a lower local inductance per unit length. However, such smaller cross sectional area is summed with the inductance per unit length at all other locations along the solenoidal coil 10, such that the whole inductance of the solenoidal coil 10 reflects the integrated volume of the flexible bladder 2, regardless of the flexible bladder 2 shape or distension. FIG. 3 examines this behavior in more detail.

FIG. 3 is a plot of cross-sectional area A(z) as a function of axis coordinate z for a representative flexible bladder 2. Note that the inductance of a solenoidal coil 10 wrapped around representative flexible bladder 2 is:

$$L = \mu_0 n^2 \int_0^l A(z)\, dz \tag{4}$$

Cross-sectional area A(z) is relatively large at a first z coordinate, $z_1$, at which representative bladder 2 is filled with a fluid 3. In other applications, a gas or combination of fluid and gas may fill bladder 2. Cross-sectional area A(z) reduces substantially at a second z coordinate, $z_2$, at a surface 4 of the fluid or gas 3. Where the bladder is filled with a fluid, cross-sectional area A(z) is negligibly small at a third z coordinate, $z_3$, above the surface 4 of the fluid 3. The volume of the fluid or gas 3 in the representative flexible bladder 2 is substantially given by:

$$V = \int_0^l A(z)\, dz \tag{5}$$

Thus, the volume in the representative flexible bladder 2 is substantially given by the relation of Equation 3. Note that the inductance varies linearly with the volume of the bladder, even in the general case of a variable cross-section of the solenoidal coil 10.

Figure 4:
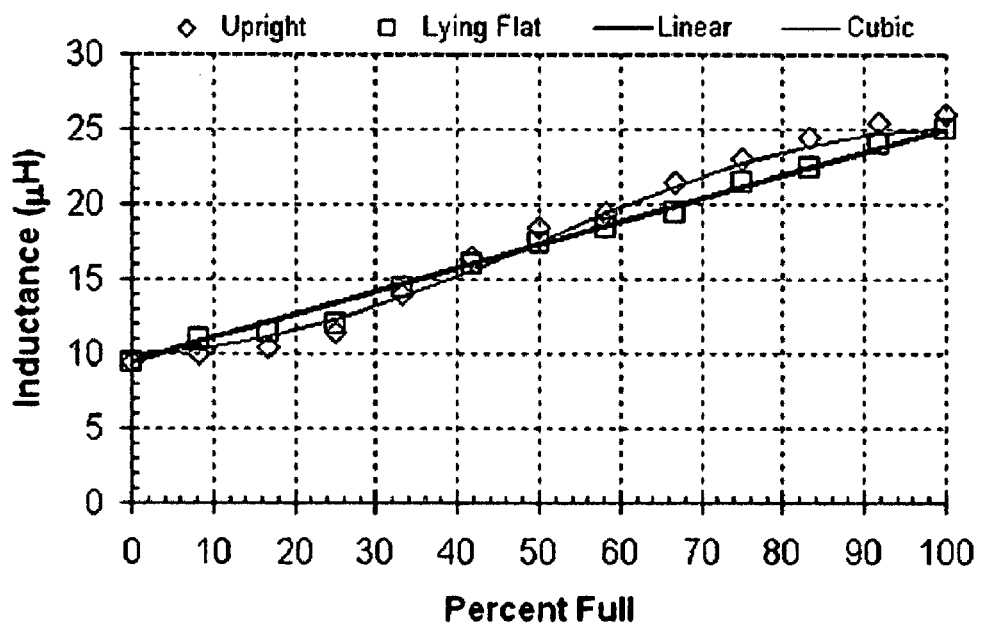
FIG. 4 is a plot of inductance versus fluid level for a representative solenoidal coil about a representative flexible bladder.

FIG. 4 is a plot of experimental measurements of inductance versus a varying volume for a solenoidal coil 10 about an experimental flexible bladder 2. In this application, water was used as the fluid to inflate the bladder and develop a volume therein, although air could also have been used with similar results.

The experimental flexible bladder 2 has a length of about 36 cm and a cross-sectional area of 92 $cm^2$. The inventors wound a solenoidal coil 10 comprising N=22 turns uniformly along the length of the experimental flexible bladder 2. The turns per unit length is n=61.1 turns/m and the predicted total inductance is:

$$L_T = \mu_0 n^2 lA = (4\pi \times 10^{-7} \text{ Hm})(61.1 \text{ turns/m})^2 (0.36 \text{ m} \times 0.0092 \text{ m}^2) = 15.54\, \mu H \tag{6}$$

Inductance measurements with the experimental flexible bladder 2 were taken with the bladder oriented in both upright and flat positions. It was discovered that there is a residual or offset inductance $L_0$=9.5 $\mu H$ even when the experimental flexible bladder 2 is empty. The residual or offset inductance may be due to stray inductance in the test leads or measurement instrument and can be accounted for by a simple calibration process. To a reasonable agreement however, it was discovered that inductance of the experimental flexible bladder 2 varies as:

$$L = L_T \frac{P}{100} + L_0 \tag{7}$$

where P is the percentage full. Thus P=0% corresponds to an empty flexible bladder 2 and P=100% corresponds to a full flexible bladder 2. The relation of Equation 7 is the "Linear" line in FIG. 4.

The "Linear" or first order polynomial model in FIG. 4 has an average error of 7.1% for the upright case and an average error of 1.9% for the flat case. The worst case error was 14.1% for the upright case and 10.4% for the lying flat case. FIG. 4 also displays a more complicated "Cubic" or third order polynomial model. The "Cubic" model in FIG. 4 has an average error of 3.5% for the upright case and an average error of 3.9% for the upright case. The worst case error was 6.8% for the upright case and 7.6% for the lying flat case.

Polynomial relations do not exhaust the ways by which volume or fluid level may be inferred from inductance. In alternate embodiments one could employ a look-up table of volume or fluid level from inductance. In still further embodiments one could employ a linear interpolation between typical measured results to yield a fluid-level or volume prediction from an inductance measurement according to the teachings of the present invention. The inventors have discovered a generally monotonic relationship between inductance and fluid-level or volume in the flexible bladder 2 that supports or enables a wide variety of predicative techniques known to those skilled in the mathematical arts.

Specific numerical results are presented here only for the sake of illustration and should be interpreted as limiting the present invention to any particular dimensions or parameters. While 22 turns of a conductive material around a hydration bladder is disclosed herein, Applicants have found that as few as 2-3 turns provides usable results, and the disclosed 22 turns provides sufficient accuracy for the intended purpose of determining a fluid quantity in a hydration bladder. With this number of coils, the spacing between coils is on the order of about ½ inch or so. Where greater accuracy is desired, more coils at a closer spacing may be used. However, more coils require more electrical power, which generally is not a consideration where ample power is available, such as an IV bag, a fuel bladder for a vehicle, or a water displacement bladder for a submersible vehicle. In a hydration bladder for combat troops, it is anticipated that a system obtaining about 5-8 percent accuracy using 20-25 coils of a conductive material may be powered by a conventional 9 volt battery, or even a button cell battery.

Figure 5:
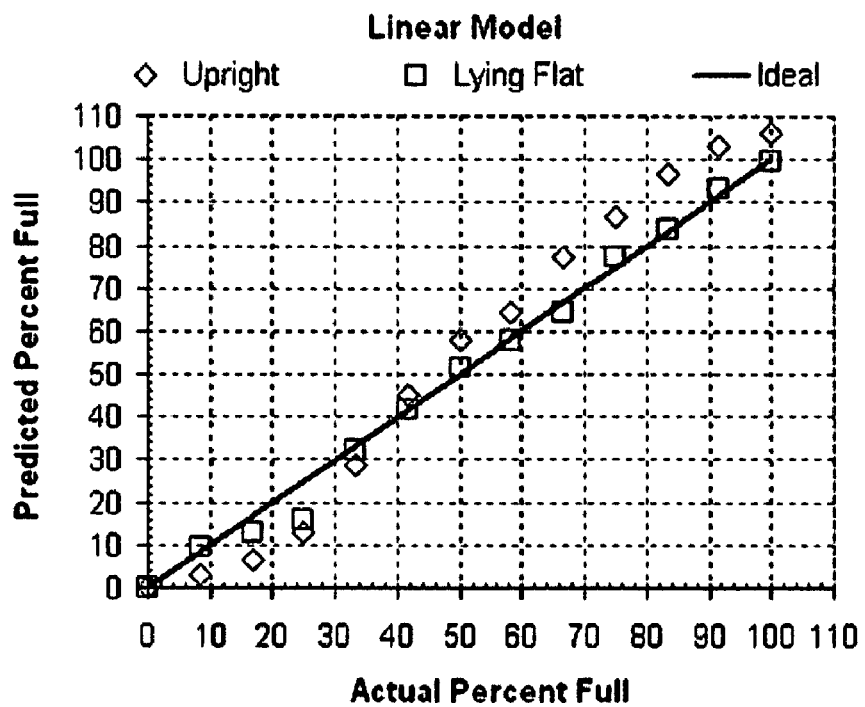
FIG. 5 is a plot of predicted versus actual volume or fluid level for the experimental flexible bladder

FIG. 5 is a plot of predicted versus actual fluid volume for an experimental flexible bladder 2.

The linear model of Equation 7 may be solved to yield a relation for percentage full (P) as a function of measured inductance L:

$$P = \frac{100(L - L_0)}{L_T} \tag{8}$$

Figure 7:
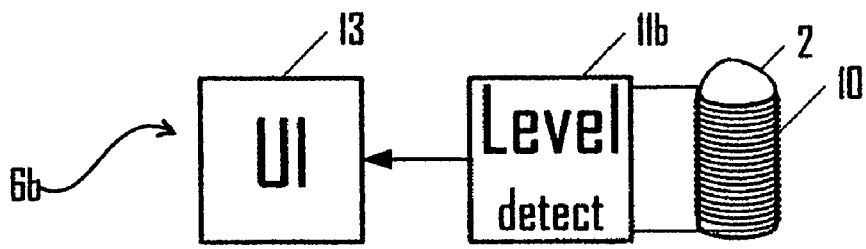
FIG. 7 is a block diagram of a volume or fluid level sensor as taught by the present invention.

Applying this model to the experimental data of FIG. 4 yields the result of FIG. 7. Again, specific numerical results and analytical methods are presented here only for the sake of illustration and should not be interpreted as limiting the present invention to any particular dimensions or parameters or to any particular technique for inferring a fluid level from an inductance measurement.

Figure 6:
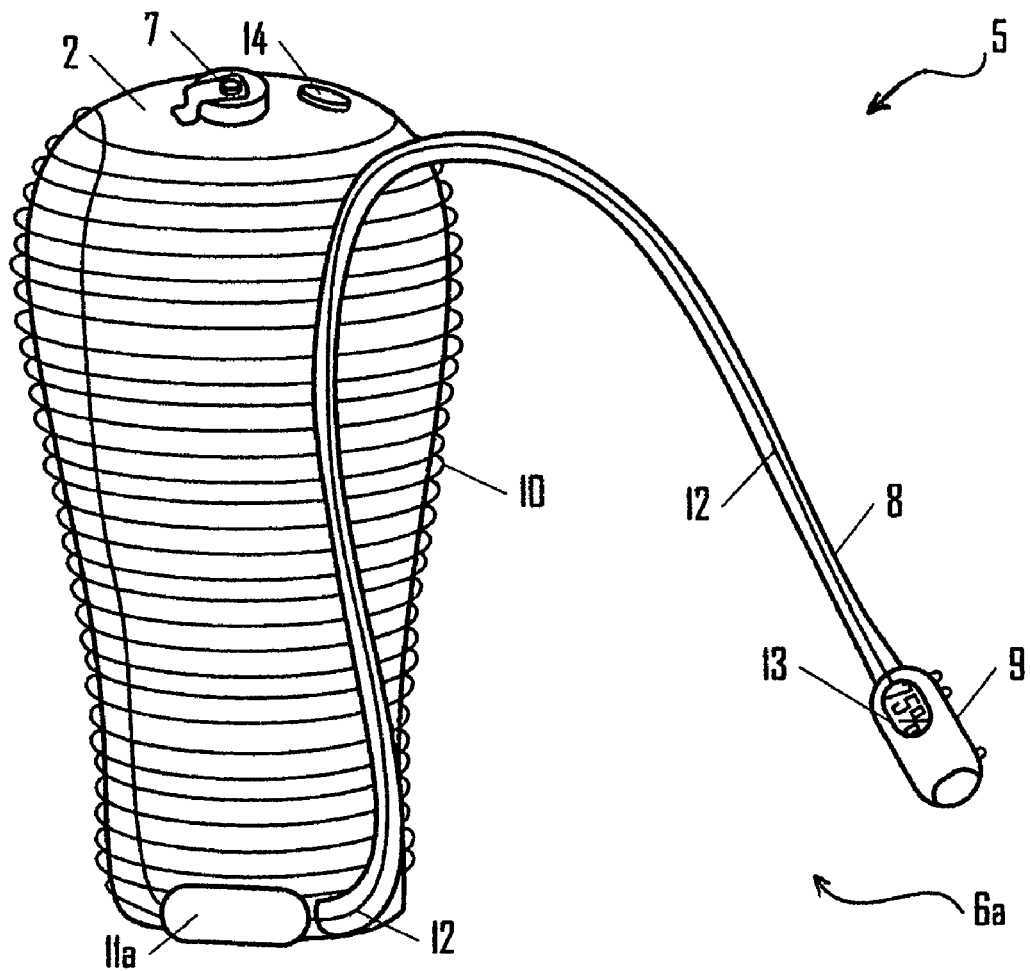
FIG. 6 is a diagram of a preferred embodiment volume or fluid level sensor incorporated in a representative canteen.

FIG. 6 is a diagram of a preferred embodiment fluid level sensor 6a incorporated in a representative bladder 5, which bladder serving as a canteen. The canteen 5 comprises the flexible bladder 2, a fill cap 7, a drinking tube 8, and a drinking nipple head 9 comprising a bite valve. The preferred embodiment fluid volume sensor 6 comprises the representative canteen 5 with the solenoidal coil 10 embedded around the flexible bladder 2, as by incorporating a conductive wire or thread within the material of the bladder. In one embodiment, fluid volume sensor 6a further comprises inductance measurement circuitry 11a coupled via a signal coupling 12, to a user interface 13.

A signal coupling 12 is a means of conveying data, signals, or other indications pertinent to a volume or fluid level measurement intermediate the inductance measurement circuitry 11a and the user interface 13. In preferred embodiments, the signal coupling 12 is an electronic coupling. In alternate embodiments, the signal coupling 12 may employ mechanical, optical, or other signal coupling means. Signal coupling 12 might convey a DC voltage proportional to volume or fluid level, a digital transmission conveying fluid level data, an RF or optical signal modulated with volume or fluid level information, or a mechanical tension, pressure, or other influence proportional to a measured fluid level.

A user interface 13 provides an indication of a volume or fluid level measurement to an individual. In alternate embodiments, a user interface 13 may provide a data interface to a local or remote machine, computer, or human observer.

In the typical canteen of the present invention, a volume or fluid level sensor 6a, a drinking tube 8 and the signal coupling 12 cooperate to extend the drinking nipple head 9 far enough away from the flexible bladder 2 so as to be readily accessible even when the flexible bladder 2 is worn in a relatively inaccessible location such as on an individual wearer's back. The user interface 13 may be incorporated in the drinking nipple head 9 for easy access.

In other embodiments, a flexible bladder 2 includes pressure valve 14 to remove air from within flexible bladder 2 without leaking fluid.

In yet other embodiments, a solenoidal coil 10 may comprise resistive or nichrome wire for keeping a fluid warm in cold climates. This embodiment is particularly suitable for use with a sock or sack as the sock or sack may be constructed as an insulative container for the bladder. In yet further embodiments, means for inductance measurement 11a may be incorporated in the nipple head 9 instead of attached to a flexible bladder 2 as shown in FIG. 5.

FIG. 7 is a block diagram of a fluid level sensor 6b as taught by the present invention. A volume or fluid level sensor 6b comprises the flexible bladder 2, the solenoidal coil 10, a means for volume or fluid level measurement 11b, and the user interface 13. The means for volume or fluid level measurement 11b interrogates the solenoidal coil 10 with electrical signals and measures the results to yield a volume or fluid level fluid measurement. In preferred embodiments, the means for volume or fluid level measurement 11b employs an inductive measurement system, device, or circuitry or some proxy measurement of inductance such as AC reactance or impedance, resonant frequency, magnetic field strength, or others known to those skilled in the electronic arts. The following embodiments will provide a few examples of how the core teachings of the present invention may be applied.

Figure 8:
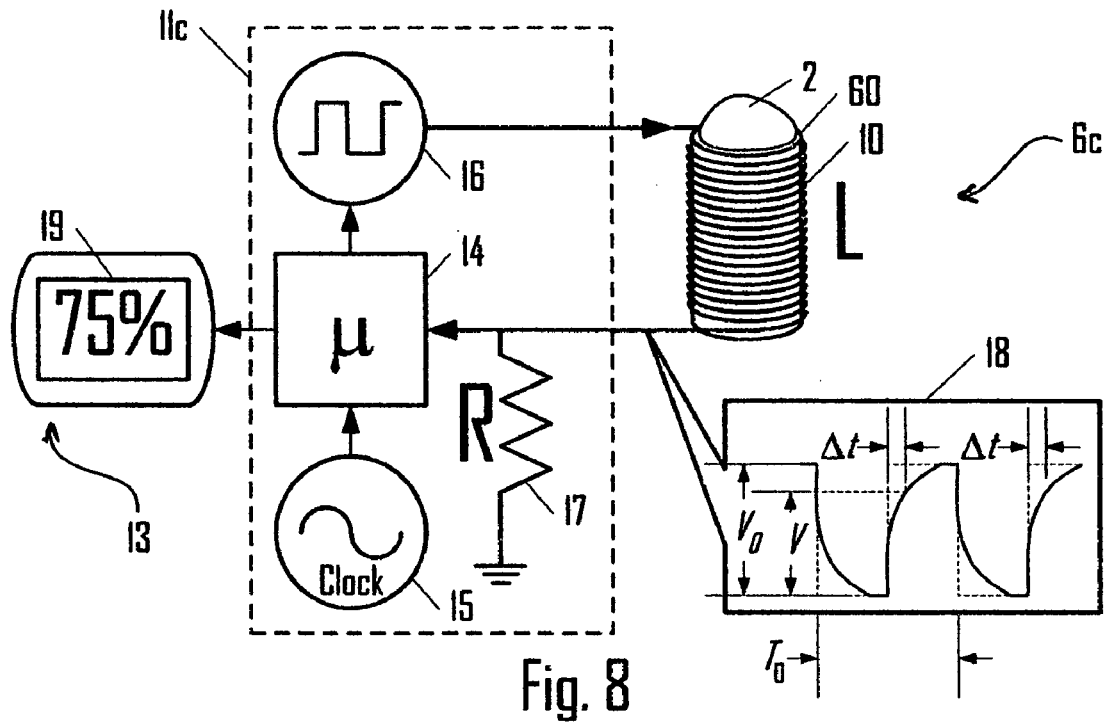
FIG. 8 is a block diagram of a volume or fluid level sensor 6 incorporating a preferred embodiment of inductive measurement means 11.

FIG. 8 is a block diagram of circuitry of one embodiment of a fluid level or volume sensor 6c incorporating the inductive measurement system of 11c. This embodiment of inductive measurement system 11c comprises a microprocessor 14 (driven by a clock 15), a square wave generator 16, and an electrical resistance 17. In alternate embodiments, the functionality of the clock 15 and the square wave generator 16 may be encompassed in a single component that serves as both the clock 15 and the square wave generator 16. In still further alternate embodiments, the clock 15 and the square wave generator 16 may be encompassed within the microprocessor 14.

In another embodiment, the inductive measurement circuitry 11c has the microprocessor 14 enabling the square wave generator 16 so as to excite the solenoidal or inductive coil 10 with an alternating series of rising and falling (or alternately, increasing and decreasing) edges of an inverted sawtooth waveform 18. The solenoidal coil 10 and the electrical resistance 17 cooperate to yield exponentially increasing and decreasing edges characterized by a time constant r equal to the ratio between the inductance L of the inductive coil 10 and the resistance R of the electrical resistance 17:

$$\tau = L/R \tag{9}$$

For best results, the frequency $T_0$ of the square wave should be chosen to be at least ten times the smallest value of the time constant τ possible for the range of inductance L to be measured in the system. Since the voltage level V is given by:

$$V = V_0 \left(1 - \exp\left[-\frac{\Delta t}{\tau}\right]\right) \tag{10}$$

the time delay Δt observed for a edge to rise to a particular voltage level V will be given by:

$$\Delta t = -\tau \ln\left(1 - \frac{V}{V_0}\right) \tag{11}$$

Thus, the inductance follows linearly from the time delay:

$$L = -\frac{R}{\ln\left(1 - \frac{V}{V_0}\right)} \Delta t \tag{12}$$

One of ordinary skill in the electronic arts can devise an appropriate combination of electrical parameters to yield an accurate inductance measurement using the result of Equation 12. In other embodiments, various periods $T_0$ of the square wave may be utilized to avoid providing a particular signal at a fixed period and frequency that might be vulnerable to detection. Immunity from detection is further enhanced by the fact that in a military embodiment, the present volume or fluid level sensor may be operated only at a particular instant at which a user wishes to monitor volume or fluid level. In other words, an input through the user interface 13 may cause the microprocessor 14 to both trigger the volume or fluid level measurement and report the result through the user interface 13. This "level-on-query" function has the further advantage of minimizing power requirements.

The microprocessor 14 may use the linear model of Equation 8 to infer volume or fluid level from inductance, a cubic model such as the one plotted in FIG. 4, an alternate polynomial fit, a look-up table, or other means to infer volume or fluid level from inductance.

In volume or fluid level sensor 6c, the user interface 13 provides a digital display 19 of percentage of fluid left in the flexible bladder 2. The digital display 19 can be an LCD display, LED display, or any other form of digital display.

In fluid level or volume sensor 6c, the user interface 13 is intended to provide data on fluid level or volume to a wearer of the flexible bladder 2. This does not preclude still further embodiments in which the user interface 13 is a database, remote data collection system or display or other means for recording fluid level or volume data or taking actions based upon fluid level data. Thus the user interface 13, as taught by the present invention, should be broadly interpreted to include any application or use of fluid level or volume data whether by a human user, an animal, a machine, or a computer. The specific case wherein the user interface 13 is designed to convey or transfer fluid level data elsewhere may be referred to as a "data interface."

Instead of being embedded in the material of the flexible bladder 2, a solenoidal coil 10 may be embedded in a sock or sack 60 containing flexible bladder 2. Here, if any portion of coil 10 happens to become damaged, it may be replaced without having to replace the entire bladder. Such a sock or sack may be constructed including an elastic fabric material incorporating the coils of conductive material, such as a spandex-type material, so that the conductive coils are always maintained in intimate contact with the bladder. The sock 60 may further comprise a vest, straps, or other structures whereby the flexible bladder may be mounted to a structure or carried by a user.

One of ordinary skill in the electronic arts can devise an appropriate combination of electrical parameters to yield an accurate inductance measurement using the result of Equation 12 and the general approach disclosed in FIG. 6. The preferred embodiment of inductive measurement means 11c herein described (employing time measurement of the rising and falling edges 18) may be referred to as "timing inductive measurement means." A wide variety of circuits are possible whereby a time delay (or equivalently a phase shift) is proportional to the magnitude of an inductance. Thus timing inductive measurement means should be broadly interpreted to include any circuit to measure inductance that relies upon an inductance dependent phase or time difference.

Figure 9:
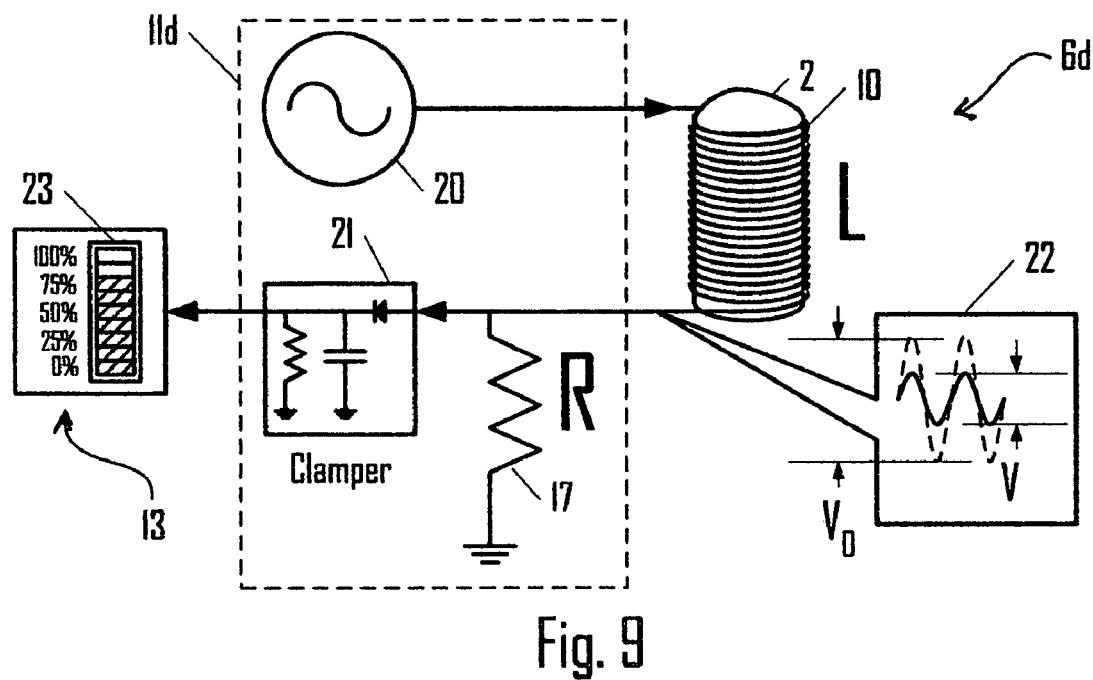
FIG. 9 is a first alternate inductive measurement for use in a volume or fluid level sensor.

FIG. 9 is a volume or fluid level sensor 6d encompassing an inductive measurement device 11d. This inductive measurement device 11d comprises a fixed frequency sine wave oscillator 20, a clamper/averager 21, and the electrical resistance 17.

The embodiment of FIG. 9 sets up an AC voltage divider between the electrical resistance 17 (R) and the solenoidal coil 10 (L). Thus, inductive measurement means in the spirit of the first alternate inductive measurement means 11d may be referred to as "AC voltage divider inductive measurement means." The AC voltage divider inductive measurement means portrayed in FIG. 9 employ an LR series circuit. A wide variety of alternate circuits are possible whereby AC voltage in a circuit including an inductance might be employed to yield a voltage amplitude related to an inductance magnitude. Thus AC voltage divider inductive measurement means should be broadly interpreted to include any circuit in which one measures a voltage amplitude that is related to an inductance.

The fixed frequency sine wave oscillator 20 provides an AC voltage signal of amplitude $V_0$ and frequency f. The voltage signal 22 (V) between the electrical resistance 17 (R) and the inductive coil 10 (L) will be given by:

$$V = V_0 \frac{R}{\sqrt{R^2 + (2\pi f L)^2}} \quad (13)$$

so the inductance is given by:

$$L = \sqrt{\frac{R^2}{(2\pi f)^2}\left[\left(\frac{V_0}{V}\right)^2 - 1\right]} \quad (14)$$

A measurement of signal amplitude V yields a measurement of the inductance L of the solenoidal coil 10. Equation 14 is a non-linear relation, but has the advantage of translating inductance L into a readily measurable voltage signal V.

The clamper/averager 21 translates this AC voltage signal V into a DC signal readily displayable in the user interface 13 comprising a voltage level display device 23 calibrated to yield an appropriate display of fluid level. The circuitry drawn in the clamper/averager 21 is meant to be illustrative of certain core components of the clamper/averager 21 without being in any way limiting the clamper/averager 21 from utilizing other ways for achieving the same end.

The voltage level display device 23 may light up LEDs, activate LCD displays, or engage other indicators correlated to specific fluid levels. The voltage level display device 23 may advantageously utilize comparators or analog-to-digital converters for this purpose. The voltage level display device 23 may be any device that transduces a voltage level into suitable form to be viewed, heard, sensed, noted, logged, recorded, appreciated, or otherwise understood by a user.

The measurement circuitry 11d has the advantage of simplicity of implementation, despite the disadvantage of non-linearity, and may be desirable for some implementations.

Figure 10:
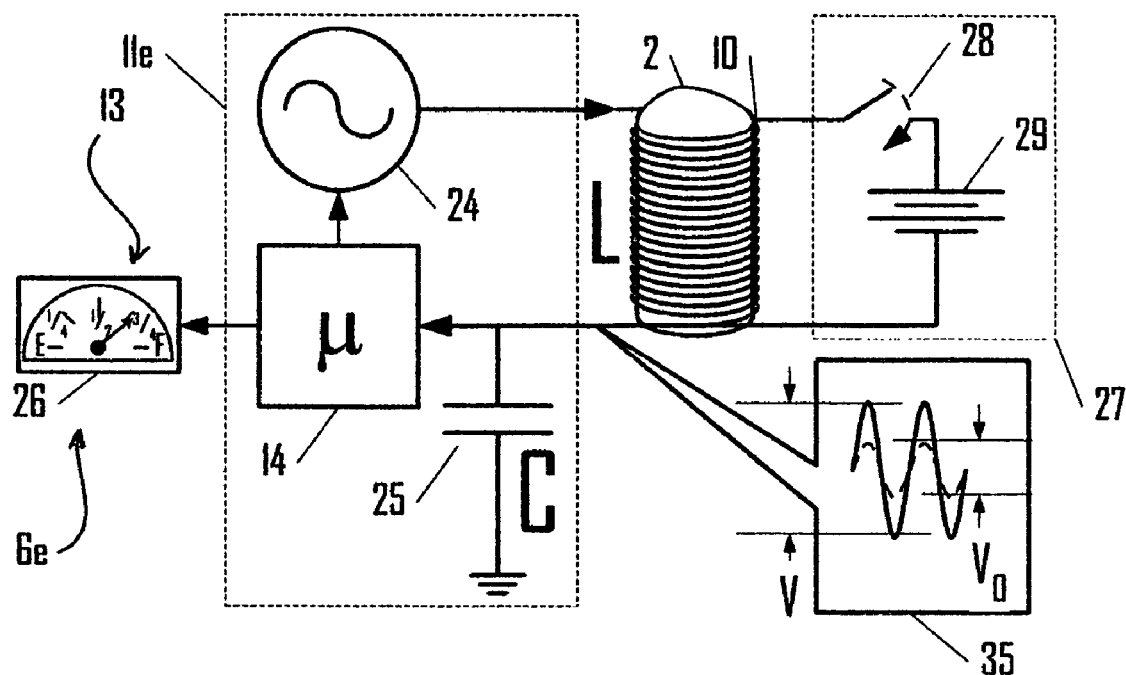
FIG. 10 is a second alternate inductive measurement for use in a volume or fluid level sensor further incorporating heating means.

FIG. 10 is another volume or fluid level sensor 6e encompassing another inductive measurement circuitry 11e. This embodiment comprises microprocessor 14, a variable oscillator 24, and a capacitor 25. In some embodiments, variable oscillator 24 is capable of digital control by microprocessor 14, which can vary the frequency f of variable oscillator 24. In other embodiments, the microprocessor 14 may use analog control or other techniques to vary frequency f of variable oscillator 24. Another volume or fluid level sensor 6e employs a current level display device 26 as user interface 13. The current level display device 26 may be a meter movement, magnetoresistive device, Hall effect sensor, piezoelectric transducer or other device that transduces a current level into suitable form to be viewed, heard, sensed, noted, logged, recorded, appreciated, or otherwise understood by a user.

This volume or fluid level sensor 6e sets up a series resonant circuit between the inductance L of solenoidal coil 10 and capacitance C of capacitor 25. The resonance frequency $f_r$ is given by:

$$f_r = \frac{1}{2\pi\sqrt{LC}} \quad (15)$$

Thus, microprocessor 14 can vary frequency f of variable oscillator 24 until resonance is reached. At resonance, voltage signal (V) 35 is at a maximum. In fact, a voltage divider, clamper, or analog-digital converter of the appropriate range and sensitivity may be advantageously employed if microprocessor 14 cannot handle typical voltage levels at resonance. Once the microprocessor detects the voltage maximum and determines the resonant frequency, the inductance is given by:

$$L = \frac{1}{C(2\pi f_r)^2} \quad (16)$$

Here again, volume or fluid level sensor 6e is more complicated than volume or fluid level sensor 6c. However, this added complexity allows volume or fluid level sensor 6e to also determine the quality factor Q of solenoidal coil 10. Quality factor Q is given by the ratio of voltage amplification of the series resonant circuit at resonance:

$$Q = \frac{V}{V_0} \quad (17)$$

If microprocessor 14 can measure the voltage V at resonance (possibly acting in conjunction with an analog-digital converter), then microprocessor 14 can determine the quality factor. The inventors have learned that although inductance varies only slightly with orientation and distortion of the flexible bladder and thus distortion of solenoidal coil 10, the quality factor varies in a more pronounced fashion with orientation and distortion of solenoidal coil 10. Thus a measure of the quality factor may yield a correction factor for the small variation in inductance that might be introduced by extreme distortions.

The inductive measurement circuitry 11e employs resonance between an inductance and a capacitance. Thus, the inductive measurement circuitry 11e may be referred to as a "resonance inductive measurement means." FIG. 10 depicts a series resonant circuit and a voltage peak detection to provide a specific example of how one might implement a resonance inductive measurement. A wide variety of alternatives are available including (without limitation) an LC parallel resonant circuit, current sensing means, magnetic field sensing means, or electric field sensing means.

Volume or fluid level sensor 6e may also include a power source 29 and control means 28 to allow power to be applied to heat up the contents of flexible bladder 2. As noted above, solenoidal coil 10 may comprise nichrome or other resistive wire to enhance suitability for this purpose.

Figure 11:
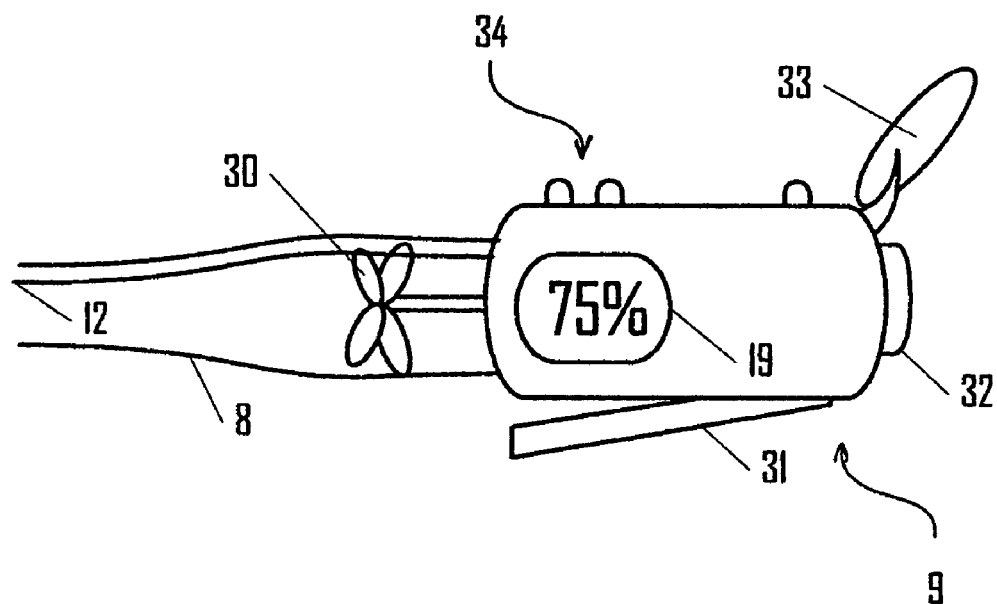
FIG. 11 is a nipple for use in a volume or fluid level sensor further incorporating a user interface and energy scavenging means.

FIG. 11 is another embodiment of the nipple head 9 for use in a volume or fluid level sensor 6b further incorporating user interface 13 and an energy scavenging mechanism.

An energy scavenging mechanism may include a turbine propeller 30 that generates electricity in response to water flowing through the drinking tube 8. The turbine propeller 30 can turn a small electric generator (not shown) to provide power for a volume or fluid level sensor 6a. In other embodiments, a user can input mechanical energy, for instance, by squeezing or turning a handle 31 that again generates power for a fluid level sensor 6b. In still further embodiments, energy from the slosh of water in the flexible bladder 2 might be a source of energy. Energy scavenging means have the potential to avoid the need for batteries to power the fluid level sensor 6a. Yet another energy scavenging system may use solar power and supercapacitors to store solar-derived energy until a request for determination of water level is provided by the user.

The user interface 13 may include not only the digital display 19, but also user controls such as buttons 34. The buttons 34 allow a user to send control signals intermediate the signal coupling 12. Thus, a user may use buttons 34 to initiate a momentary volume or fluid level query, to turn on or off a continuous volume or fluid level query, or to access any other functionality of a fluid level sensor 6e. The nipple head 9 may further comprise a cap 33 to cover and protect a nozzle 32 from dust or other contamination.

Figure 12:
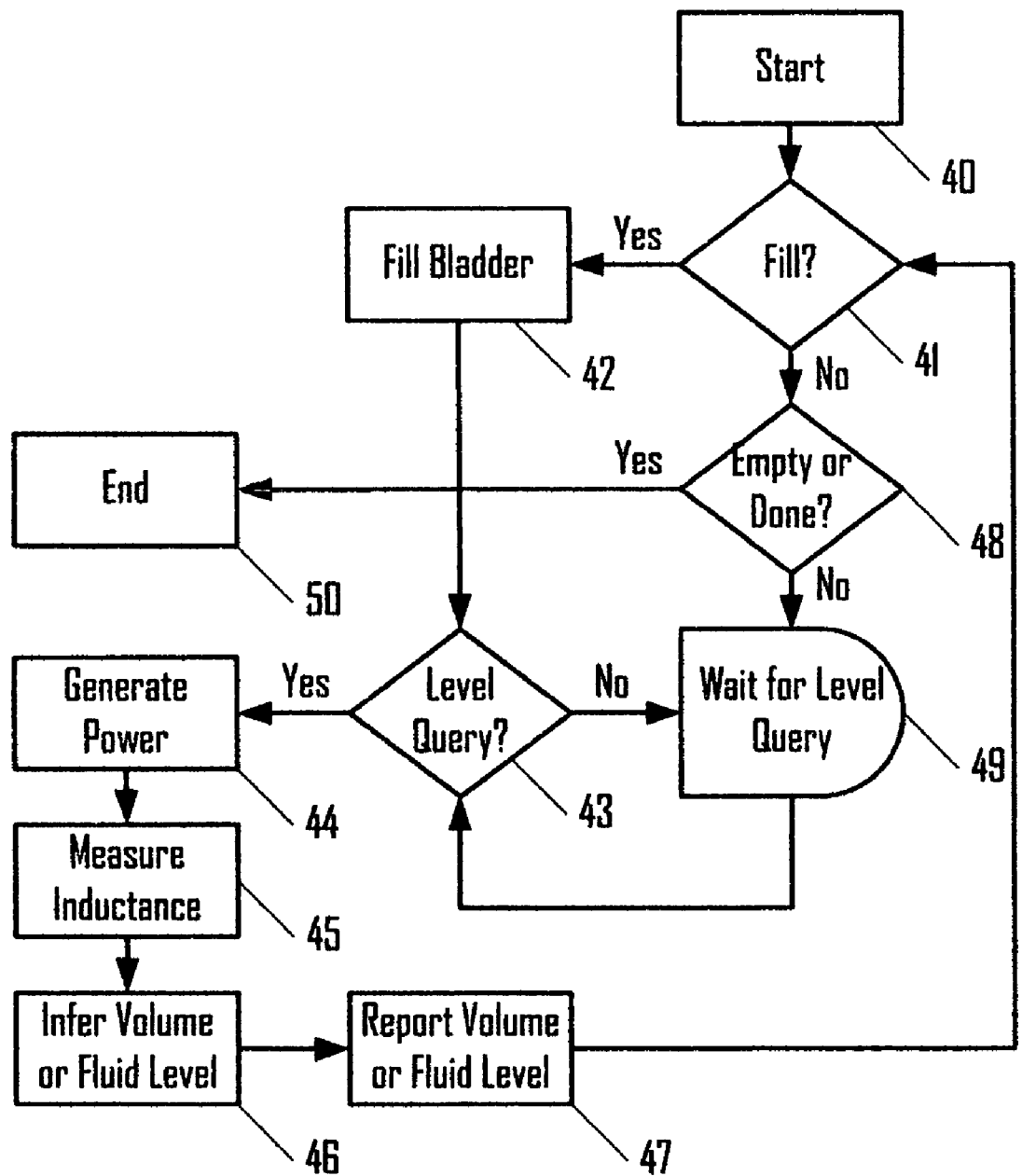
FIG. 12 is a process flow diagram for a volume or fluid level sensing method.

FIG. 12 is a process flow diagram for a volume or fluid level sensing method 51. Here, the volume or fluid level sensing method 51 begins with a START block 40. The volume or fluid level sensing method 51 continues with a FILL decision block 41. If the outcome of the FILL decision block 41 is "yes," then the volume or fluid level sensing method 51 continues with the FILL BLADDER block 42. In FILL BLADDER block 42, a user fills the flexible bladder 2 with fluid. If the outcome of the FILL decision block 41 is "no," then the volume or fluid level sensing method 51 continues with the EMPTY OR DONE decision block 48. If the flexible bladder 2 is empty or for any other reason the process may be allowed to end, then the outcome of completion decision block 48 is "yes" then the fluid level sensing method 51 terminates in END block 50. Otherwise, the outcome of completion decision block 48 is "no," and the volume or fluid level sensing method 51 continues in WAIT FOR LEVEL QUERY at block 49.

The volume or fluid level sensing method 51 continues with a LEVEL QUERY decision block 43. After the FILL BLADDER block 42, the fluid level sensing method 51 also continues with the LEVEL QUERY decision block 43. The LEVEL QUERY decision block 43 may be a user initiated level query, a third party initiated level query, or a machine or computer initiated level query. If a volume or fluid level measurement is desired, then the LEVEL QUERY decision block 43 has an outcome of "yes," and the volume or fluid level sensing method 51 continues with optional GENERATE POWER at block 44. In a continuous query mode, outcome of the LEVEL QUERY decision block 43 may default to "yes." If the LEVEL QUERY decision block 43 has outcome "no," then the volume or fluid level sensing method 51 continues with WAIT FOR LEVEL QUERY at block 49.

In optional GENERATE POWER block 44, scavenged power is made available to perform the inductance measurement of MEASURE INDUCTANCE block 45, INFER FLUID LEVEL at block 46, and REPORT FLUID LEVEL at block 47. Once the process described in optional GENERATE POWER at block 44 is complete, or if optional GENERATE POWER at block 44 is omitted, then the volume or fluid level sensing method 51 continues with the MEASURE INDUCTANCE at block 45.

The MEASURE INDUCTANCE block 45 describes the process of measuring inductance of solenoidal coil 10 from which, according to the teachings of the present invention, one might infer volume or fluid level in the flexible bladder 2. The MEASURE INDUCTANCE block 45 may encompass any inductance measurement 11b known to one of ordinary skills in the electronic arts. These ways of inductance measurement 11b may include (but are not limited to) one embodiment wherein inductance measurement 11c relies on a phase shift or time delay proportional to the LR time constant T (timing inductive means), and an inductance measurement 11d relying on an AC voltage divider (AC voltage divider inductive means), or an inductance measurement 11e relying on resonance behavior (resonance inductive measurement means). This enumeration of a few particular ways of inductance measurement does not preclude use of any other inductance measurements known to one of ordinary skills in the electronic arts. Nor should this enumeration of means of inductance measurement preclude measurement of proxy parameters correlated to inductance such as ones related to magnetic field strength with a particular applied current.

Volume or fluid level sensing method 51 continues with INFER FLUID LEVEL at block 46. In block 46, the volume, fluid level or quantity of fluid is inferred from a proportionality to inductance, such as that described in Equation 3. In other embodiments, the volume or fluid level or quantity may be empirically inferred from inductance using a mathematical relationship that fits empirical data, a look-up table, or any other similar method accomplishing substantially the same result.

The volume or fluid level sensing method 51 continues with REPORT FLUID LEVEL at block 47. In block 47, the volume or fluid level is made evident to a user through user interface 13. User interface 13 may employ a digital display 19, voltage level display device 23, current volume or fluid level display device 26, or any other user interface 13 capable of effectively communicating a volume or fluid level to an intended user. User interface 13 may also employ involve a data interface to a local or remote machine. The volume or fluid level sensing method 51 continues with the FILL decision block 41, described above.

The core teaching of the present invention is embodied in the three key steps of the volume or fluid level sensing method 51: an inductance measurement at block 45, a volume or fluid level inference at block 46, and finally a fluid level report at block 47.

Specific applications have been presented solely for purposes of illustration to aid the reader in understanding a few of the great many contexts in which the present invention will prove useful. Although the present invention has been illustrated and described in the context of a volume or fluid level sensor for use in conjunction with a hydration system preferentially for military application, it should be understood that the teachings of the present invention are directly applicable to a wide variety of other fluid, gas and volume sensing problems related to flexible bladders. It should also be understood that, while the detailed drawings and specific examples given describe preferred embodiments of the invention, they are for purposes of illustration only, that the system and method of the present invention are not limited to the precise details and conditions disclosed and that various changes may be made therein.

Having thus described our invention and the manner of its use, it should be apparent to those skilled in the relevant arts that incidental changes may be made thereto that fairly fall within the scope of the following appended claims, wherein we claim:

1. A fluid or gas quantity or volume sensing system comprising:
   a flexible container having an interior configuration that varies as a quantity of said fluid or gas is added or removed, or as said container is repositioned;
   a coil disposed around said flexible container;
   means coupled to said coil for inductance measurement of said quantity or volume as said interior configuration varies; and
   a user interface for indicating to a user a measured said quantity or volume of said fluid or gas within said flexible container.

2. The sensing system in claim 1 wherein said coil is embedded in said flexible container.

3. The sensing system in claim 1 wherein said coil is incorporated in a sock or sack substantially encompassing said flexible container.

4. The sensing system in claim 1 wherein said means for inductance measurement is selected from the set including:
   timing inductive measurement means;
   AC voltage divider inductive measurement means; and
   resonance inductive measurement means.

5. The sensing system in claim 4 wherein said user interface is selected from the set including:
   a digital display;
   a data interface;
   a voltage level display device; and
   a current level display device.

6. The sensing system in claim 1 wherein said user interface is selected from the set including:
   a digital display;
   a data interface;
   a voltage level display device; and
   a current level display device.

7. The sensing system in claim 6 wherein said means for inductance measurement is selected from the set including:
   timing inductive measurement means;
   AC voltage divider inductive measurement means; and
   resonance inductive measurement means.

8. A fluid quantity or volume sensing hydration system comprising:
   a flexible container adapted to be carried by a user and having an interior configuration that varies as fluid is added or removed, or as said container is repositioned;
   a coil substantially encompassing said flexible container;
   means coupled to said coil for determining a quantity or volume of fluid within said container as said interior configuration varies; and,
   a user interface responsive to said means for determining said quantity or volume, for providing an indication of said quantity or volume of said fluid to a user.

9. The sensing hydration system in claim 8 wherein said means for determining a quantity or volume includes a means for inductance measurement.

10. The sensing hydration system in claim 9 wherein said means for determining a quantity or volume is selected from the set including:
    timing inductive measurement means;
    AC voltage divider inductive measurement means; and
    resonance inductive measurement means.

11. The sensing hydration system in claim 10 further encompassing energy scavenging means for providing power to said sensing system.

12. The sensing hydration system in claim 11 wherein said energy scavenging means is selected from the set including:
    a turbine propeller; and
    a compressible handle.

13. A method for sensing a volume or quantity of fluid, gas or combination of fluid and gas comprising:
    measuring inductance of said volume or quantity of said fluid, gas, or combination of fluid and gas within a flexible container having an interior configuration that varies as said fluid, gas, or combination of fluid and gas is added or removed or as said flexible container changes shape;
    inferring said quantity or volume of said fluid, gas, or combination of fluid and gas within said flexible container from a measured said inductance; and indicating said quantity or volume of said fluid, gas or combination of fluid and gas to a user.

14. The sensing method in claim 13 wherein said inductance measurement is performed by inductive measurement means selected from the set including:
   timing inductive measurement means;
   AC voltage divider inductive measurement means; and
   resonance inductive measurement means.

15. The sensing method in claim 13 further comprising generating power from energy scavenging means.

16. The sensing method in claim 13 wherein said indicating said quantity or volume utilizes an interface selected from the set including:
   a digital display;
   a data interface;
   a voltage level display device; and
   a current level display device.

17. The sensing method in claim 13 further comprising a fluid quantity or volume query initiated by said user, by another person, or by a machine or computer.

18. The sensing method in claim 13 wherein said inferring a quantity or volume utilizes a method selected from the set including:
   a polynomial model of inductance versus fluid quantity or volume;
   a look-up table of fluid quantity or volume from inductance; and
   a linear interpolation between typical measured results.

19. The sensing method in claim 18 wherein said polynomial is selected from the set including a linear fit and a cubic fit.

20. The sensing method in claim 18 further comprising initiating a fluid quantity or volume query by a user, by another person or by a machine or computer.

* * * * *